(12) United States Patent
Ibarra

(10) Patent No.: US 8,474,490 B1
(45) Date of Patent: Jul. 2, 2013

(54) SLIP BRASS NIPPLE AND ASSOCIATED METHOD

(76) Inventor: Juan M. Ibarra, Pasadena, CA (US)

(*) Notice: Subject to any disclaimer, the term of this patent is extended or adjusted under 35 U.S.C. 154(b) by 0 days.

(21) Appl. No.: 13/406,330

(22) Filed: Feb. 27, 2012

Related U.S. Application Data

(60) Provisional application No. 61/446,520, filed on Feb. 25, 2011.

(51) Int. Cl.
*F16L 9/00* (2006.01)

(52) U.S. Cl.
USPC .......................... 138/109; 138/155

(58) Field of Classification Search
USPC .................................. 138/109, 155
See application file for complete search history.

(56) References Cited

U.S. PATENT DOCUMENTS

| | | | | |
|---|---|---|---|---|
| 1,542,334 A * | 6/1925 | Burgess | ........................... | 285/55 |
| 1,792,941 A * | 2/1931 | Stevenson | ........................ | 285/55 |
| 1,955,930 A * | 4/1934 | Oliver | ........................... | 285/243 |
| 3,227,803 A * | 1/1966 | Gohs | ................................ | 174/78 |
| 3,413,017 A * | 11/1968 | Hughey | ........................... | 285/38 |
| 3,520,561 A * | 7/1970 | Rininger | ........................ | 285/24 |
| 3,588,148 A * | 6/1971 | Barsumian | ........................ | 285/8 |
| 3,895,177 A * | 7/1975 | Muslin | ........................... | 174/669 |
| 4,005,735 A * | 2/1977 | Miyamoto | .................. | 138/96 R |
| 4,428,602 A * | 1/1984 | Lambot et al. | ................ | 285/239 |
| 4,632,148 A * | 12/1986 | Stark et al. | ............... | 137/624.18 |
| 4,687,232 A | 8/1987 | Zimmerman | | |
| 4,768,455 A * | 9/1988 | Maxson et al. | ................ | 114/264 |
| 4,773,149 A * | 9/1988 | Kip et al. | ........................ | 29/428 |
| 4,880,260 A | 11/1989 | Gotoh et al. | | |
| D355,641 S * | 2/1995 | Down | .......................... | D13/151 |
| 5,484,174 A | 1/1996 | Gotoh et al. | | |
| 5,915,736 A * | 6/1999 | Marik et al. | .................. | 285/21.3 |
| 6,264,244 B1 * | 7/2001 | Isennock et al. | ................ | 285/55 |
| 6,276,399 B1 * | 8/2001 | Fox | ................ | 138/109 |
| 6,491,546 B1 * | 12/2002 | Perry | ....................... | 439/620.03 |
| 6,651,272 B2 * | 11/2003 | Bowman | ........................... | 4/679 |
| 6,722,392 B1 * | 4/2004 | David et al. | .................... | 138/109 |
| 7,090,309 B2 * | 8/2006 | Blessing et al. | ........... | 301/124.1 |
| 2005/0151369 A1 | 7/2005 | Baruh | | |
| 2006/0174968 A1* | 8/2006 | De Luna | ....................... | 141/114 |
| 2006/0181082 A1* | 8/2006 | Gray | .............................. | 285/901 |
| 2008/0202622 A1* | 8/2008 | Cho et al. | ...................... | 138/155 |
| 2012/0312410 A1* | 12/2012 | Choi | .............................. | 138/109 |

* cited by examiner

*Primary Examiner* — James Hook

(57) ABSTRACT

A slip brass nipple includes a tubular brass body that may be approximately 6 inches long. The apparatus includes a threaded proximal end, a non-slip gripping portion and an open distal end n. The open distal end includes an internal stop to allow a copper pipe to slip in and terminate at a predetermined distance such that the gripping portion may be used to tighten onto a female tube fitting. The apparatus advantageously enable galvanized and copper pipes to be connected together while significantly reducing the risk of galvanic corrosion caused by a dielectric reaction between the galvanized steel and copper pipes. The slip brass nipple may be manufactured in ½, ¾, 1, 1¼, 1½ and 2 inch diameters and may be manufactured according to brass material regulations in the industry.

8 Claims, 3 Drawing Sheets

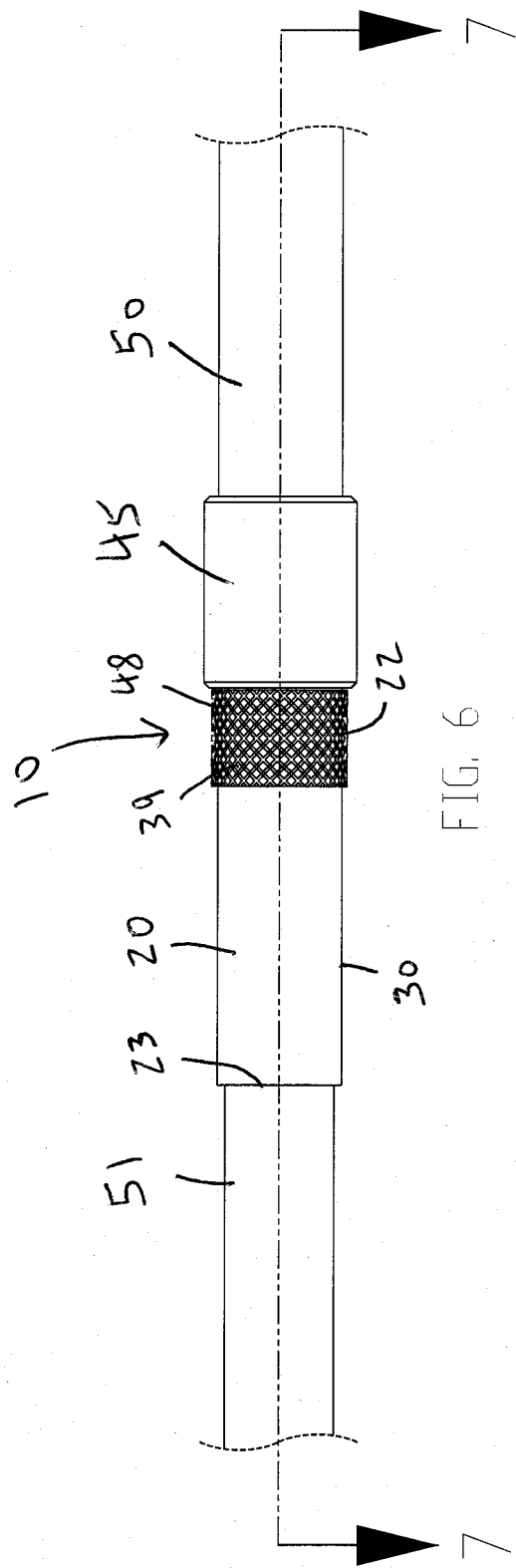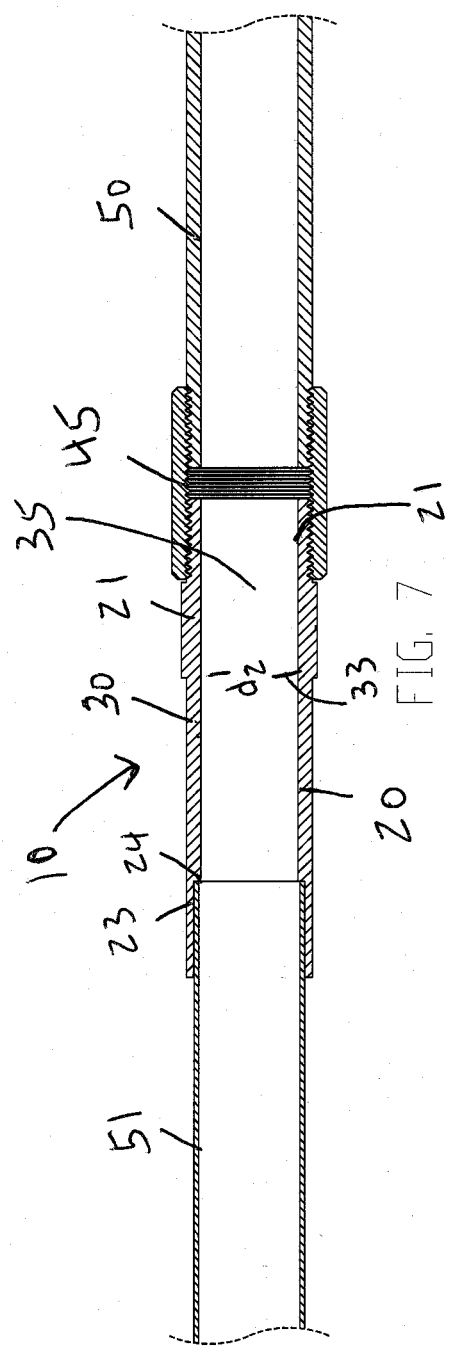

SLIP BRASS NIPPLE AND ASSOCIATED METHOD

CROSS REFERENCE TO RELATED APPLICATIONS

This application claims the benefit of U.S. Provisional Application No. 61/446,520 filed Feb. 25, 2011, the entire disclosures of which are incorporated herein by reference.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF NON-LIMITING EXEMPLARY EMBODIMENT(S) OF THE PRESENT DISCLOSURE

1. Technical Field

This invention relates to pipe fittings and, more particularly, to a slip brass nipple for providing users with an easy and convenient means of preventing corrosion between galvanize and copper pipes when fitted together.

2. Prior Art

Corrosion is the wearing away of metals due to their reaction with an oxidant such as oxygen resulting in an oxide being formed, for example the rust is the formation of an oxide of iron due to oxidation of the iron atoms. Corrosion can also refer to other materials such as ceramics or polymers, although in this context, the term degradation is more common. Galvanic corrosion occurs when two different metals electrically contact each other when an electrically conductive path and an ionically conductive path are present. This results in a galvanic couple where the more active metal corrodes at an accelerated rate and the more noble metal corrodes at a retarded rate. Neither metal would normally corrode as quickly without the electrically conductive connection. Galvanic corrosion is therefore a major problem where water can contact pipes or metal structures.

Metallic pipes such as copper and galvanized steel is still one of the most common types of piping in use in the home and industry in the United States. Thus galvanic corrosion remains the main cause of more than 700 water main breaks every day throughout North America (see www.watermainbreakclock.com). A 2002 congressional study found corrosion costs U.S. drinking water and sewer systems $50.7 billion annually (ref: http://www.heartland.org).

Accordingly, a need remains for an apparatus in order to overcome the above-noted shortcomings. The present invention satisfies such a need by providing a slip brass nipple that is convenient and easy to use, lightweight yet durable in design, versatile in its applications, and designed for preventing corrosion between galvanize and copper pipes when fitted together.

BRIEF SUMMARY OF NON-LIMITING EXEMPLARY EMBODIMENT(S) OF THE PRESENT DISCLOSURE

In view of the foregoing background, it is therefore an object of the non-limiting exemplary embodiment(s) to provide a slip brass nipple for preventing galvanic corrosion caused by a dielectric reaction. These and other objects, features, and advantages of the non-limiting exemplary embodiment(s) are provided by a slip brass nipple including a tubular brass body including an open, threaded proximal end, a gripping portion integrally formed with an outer surface of the body and located adjacent to the proximal end, and an open distal end spaced from the gripping portion. The open distal end includes an internal stop formed at in interior surface thereof. The body has first and second diameters wherein the first diameter begins from the open distal end and terminates at the internal stop. The second diameter begins from the open, threaded proximal end and terminates at the internal stop.

In a non-limiting exemplary embodiment, the body is entirely hollow and is provided with non-uniform passageway formed therein, the passageway extending through an entire longitudinal length of the body.

In a non-limiting exemplary embodiment, the second diameter extends along a major longitudinal length of the body.

In a non-limiting exemplary embodiment, the first diameter extends along a minor longitudinal length of the body.

In a non-limiting exemplary embodiment, the gripping portion has an outermost surface provided with a plurality of indentations for creating a non-slip region.

In a non-limiting exemplary embodiment, an outermost diameter of the open, threaded region is smaller than an outermost diameter of the gripping portion.

In a non-limiting exemplary embodiment, the first and second diameters uniformly extend along minor and major longitudinal lengths of the body, respectively.

The present disclosure further includes a method of utilizing a slip brass nipple for preventing galvanic corrosion caused by a dielectric reaction. Such a method includes the initial step of: providing a tubular brass body including an open, threaded proximal end, a gripping portion integrally formed with an outer surface of the body and located adjacent to the proximal end, and an open distal end spaced from the gripping portion. The open distal end includes an internal stop formed at in interior surface thereof. The body has first and second diameters wherein the first diameter begins from the open distal end and terminates at the internal stop. The second diameter begins from the open, threaded proximal end and terminates at the internal stop.

The method further includes the chronological steps of: providing and threadably engaging a galvanized pipe with the open, threaded proximal end of the body; providing and inserting a copper pipe into the open distal end of the body until a leading end of the copper pipe reaches the internal stop; and welding the copper pipe to the open distal end of the body such that the galvanized pipe and the copper pipe remain spaced apart and do not create a dielectric reaction.

There has thus been outlined, rather broadly, the more important features of non-limiting exemplary embodiment(s) of the present disclosure so that the following detailed description may be better understood, and that the present contribution to the relevant art(s) may be better appreciated. There are additional features of the non-limiting exemplary embodiment(s) of the present disclosure that will be described hereinafter and which will form the subject matter of the claims appended hereto.

BRIEF DESCRIPTION OF THE NON-LIMITING EXEMPLARY DRAWINGS

The novel features believed to be characteristic of non-limiting exemplary embodiment(s) of the present disclosure are set forth with particularity in the appended claims. The non-limiting exemplary embodiment(s) of the present disclosure itself, however, both as to its organization and method of operation, together with further objects and advantages thereof, may best be understood by reference to the following description taken in connection with the accompanying drawings in which:

FIG. 6 is a side elevational view showing a galvanized pipe attached to an open, threaded proximal end of the slip brass nipple illustrated in FIG. 1 and a copper pipe welded to an open distal end of the slip brass nipple; and FIG. 7 is a cross-sectional view taken along line 7-7 shown in FIG. 6

Figure 1:
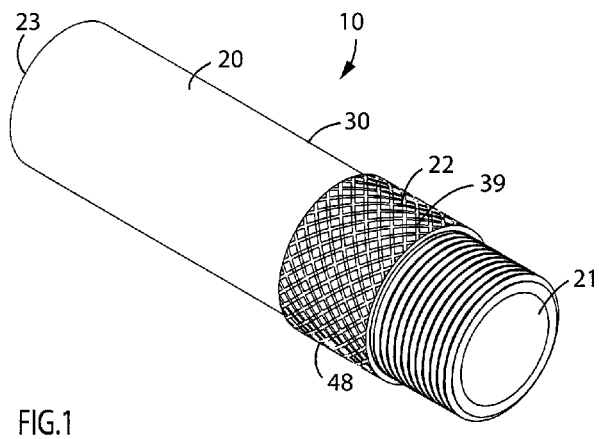
FIG. 1 is a perspective view showing a slip brass nipple, in accordance with a non-limiting exemplary embodiment.

Those skilled in the art will appreciate that the figures are not intended to be drawn to any particular scale; nor are the figures intended to illustrate every non-limiting exemplary embodiment(s) of the present disclosure. The present disclosure is not limited to any particular non-limiting exemplary embodiment(s) depicted in the figures nor the shapes, relative sizes or proportions shown in the figures.

DETAILED DESCRIPTION OF NON-LIMITING EXEMPLARY EMBODIMENT(S) OF THE PRESENT DISCLOSURE

The present disclosure will now be described more fully hereinafter with reference to the accompanying drawings, in which non-limiting exemplary embodiment(s) of the present disclosure is shown. The present disclosure may, however, be embodied in many different forms and should not be construed as limited to the non-limiting exemplary embodiment(s) set forth herein. Rather, such non-limiting exemplary embodiment(s) are provided so that this application will be thorough and complete, and will fully convey the true spirit and scope of the present disclosure to those skilled in the relevant art(s). Like numbers refer to like elements throughout the figures.

The illustrations of the non-limiting exemplary embodiment(s) described herein are intended to provide a general understanding of the structure of the present disclosure. The illustrations are not intended to serve as a complete description of all of the elements and features of the structures, systems and/or methods described herein. Other non-limiting exemplary embodiment(s) may be apparent to those of ordinary skill in the relevant art(s) upon reviewing the disclosure. Other non-limiting exemplary embodiment(s) may be utilized and derived from the disclosure such that structural, logical substitutions and changes may be made without departing from the true spirit and scope of the present disclosure. Additionally, the illustrations are merely representational are to be regarded as illustrative rather than restrictive.

One or more embodiment(s) of the disclosure may be referred to herein, individually and/or collectively, by the term "non-limiting exemplary embodiment(s)" merely for convenience and without intending to voluntarily limit the true spirit and scope of this application to any particular non-limiting exemplary embodiment(s) or inventive concept.

Moreover, although specific embodiment(s) have been illustrated and described herein, it should be appreciated that any subsequent arrangement designed to achieve the same or similar purpose may be substituted for the specific embodiment(s) shown. This disclosure is intended to cover any and all subsequent adaptations or variations of other embodiment (s). Combinations of the above embodiment(s), and other embodiment(s) not specifically described herein, will be apparent to those of skill in the relevant art(s) upon reviewing the description.

References in the specification to "one embodiment(s)", "an embodiment(s)", "a preferred embodiment(s)", "an alternative embodiment(s)" and similar phrases mean that a particular feature, structure, or characteristic described in connection with the embodiment(s) is included in at least an embodiment(s) of the non-limiting exemplary embodiment (s). The appearances of the phrase "non-limiting exemplary embodiment" in various places in the specification are not necessarily all meant to refer to the same embodiment(s).

Directional and/or relationary terms such as, but not limited to, left, right, nadir, apex, top, bottom, vertical, horizontal, back, front and lateral are relative to each other and are dependent on the specific orientation of an applicable element or article, and are used accordingly to aid in the description of the various embodiment(s) and are not necessarily intended to be construed as limiting.

Figure 2:
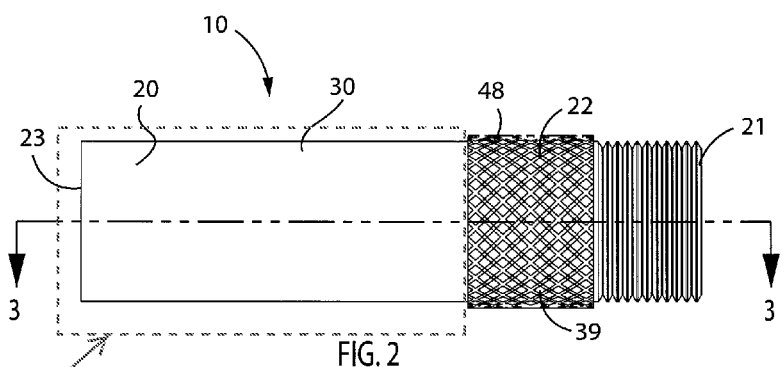
FIG. 2 is a side elevational view of the slip brass nipple.
Figure 3:
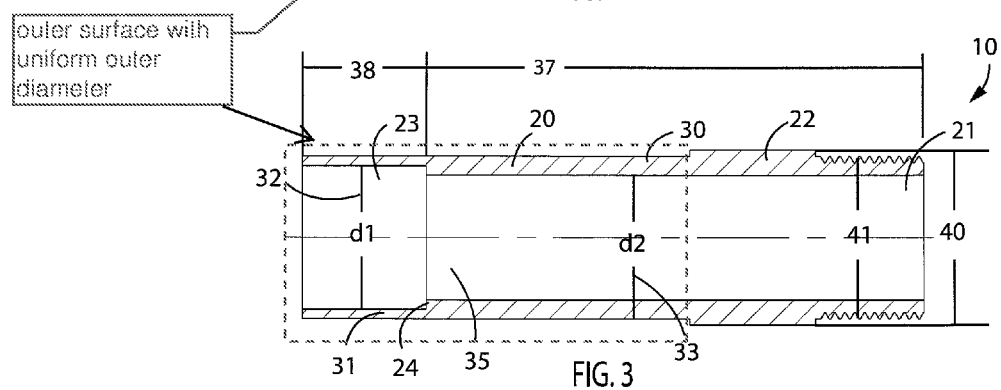
FIG. 3 is a cross-sectional view taken along line 3-3 in FIG. 2.
Figure 4:
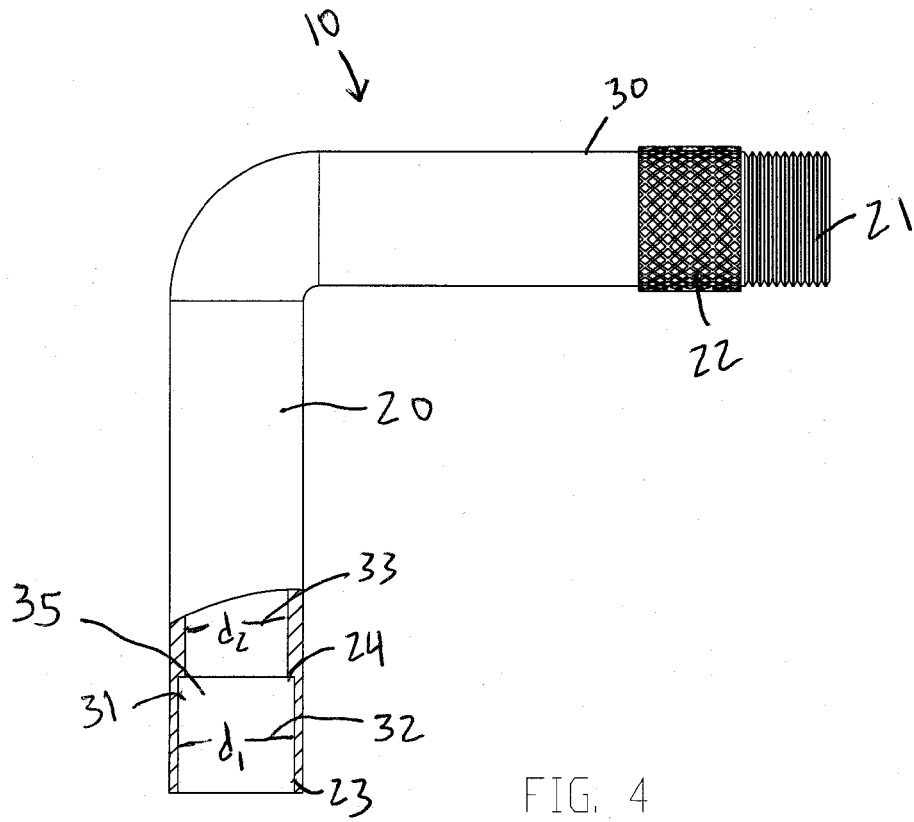
FIG. 4 is a partially broken-away view of the slip brass nipple, in accordance with a non-limiting exemplary embodiment.
Figure 5:
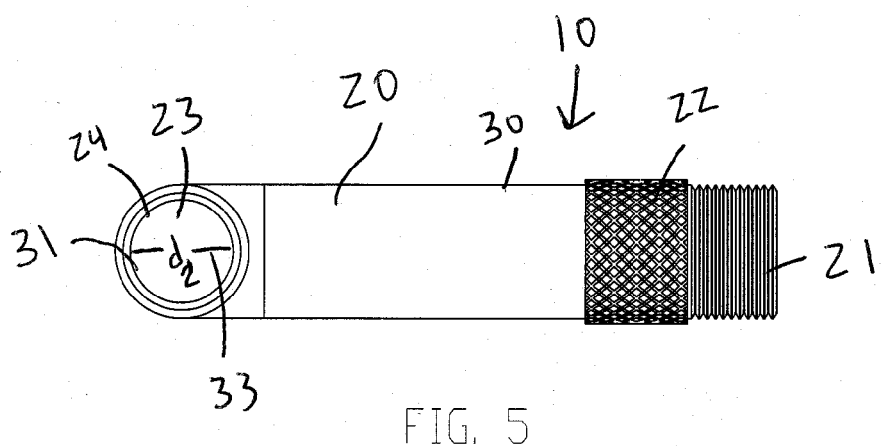
FIG. 5 is a top plan view of the slip brass nipple shown in FIG. 4.

The non-limiting exemplary embodiment(s) is/are referred to generally in FIGS. 1-7 and is/are intended to provide a slip brass nipple 10. It should be understood that such non-limiting exemplary embodiment(s) may be used to connect a galvanized pipe 50 to a copper pipe 51 for preventing a dielectric reaction between the galvanized and copper pipes 50, 51.

Referring to the figures in general, a slip brass nipple 10 for preventing galvanic corrosion caused by a dielectric reaction is shown as including a tubular brass body 20 including an open, threaded proximal end 21, a gripping portion 22 integrally formed with an outer surface 30 of the body 20 and located adjacent to the proximal end 21. An open distal end 23 is spaced from the gripping portion 22 and includes an internal stop 24 formed at in interior surface 31 thereof. The body 20 has first ($d_1$) and second ($d_2$) diameters 32, 33 wherein the first diameter 32 begins from the open distal end 23 and terminates at the internal stop 24. The second diameter 33 begins from the open, threaded proximal end 21 and terminates at the internal stop 24. Such a structural configuration provides the unexpected and unpredictable advantage of ensuring the galvanized pipe 50 and copper pipe 51 to not cause a dielectric reaction (e.g., corrosion).

In a non-limiting exemplary embodiment, the body 20 is entirely hollow and is provided with non-uniform passageway 35 (diameter changes between $d_1$ and $d_2$) formed therein. Such a passageway 35 extends through an entire longitudinal length of the body 20. Such a structural configuration provides the unexpected and unpredictable advantage of ensuring there is sufficient interior space to receive and support the pipes 50, 51 therein.

In a non-limiting exemplary embodiment, the second diameter 33 extends along a major longitudinal length 37 of the body 20. Such a structural configuration provides the unexpected and unpredictable advantage of receiving the galvanized pipe 50 along the major longitudinal length and thereby adequately supporting same with the nipple 10.

In a non-limiting exemplary embodiment, the first diameter 32 extends along a minor longitudinal length 38 of the body 20. Such a structural configuration provides the unexpected and unpredictable advantage of minimizing copper exposure within passageway 35 and preventing a galvanic corrosion at the proximal end of body 10.

In a non-limiting exemplary embodiment, the gripping portion 22 has an outermost surface 48 provided with a plurality of indentations 39 for creating a non-slip region. Such a structural configuration provides the unexpected and unpredictable advantage of ensuring the user maintains a suitable grip when threadably engaging galvanized pipe 50.

In a non-limiting exemplary embodiment, an outermost diameter 40 of the open, threaded proximal end 21 is smaller than an outermost diameter 41 of the gripping portion 22. Such a structural configuration provides the unexpected and unpredictable advantage of ensuring a separate coupling 45 simultaneously mates the galvanized pipe 50 to body 10.

In a non-limiting exemplary embodiment, the first and second diameters 32, 33 uniformly extend along minor and major longitudinal lengths 38, 37 of the body 20, respectively. Such a structural configuration provides the unexpected and unpredictable advantage of ensuring the internal stop 24 (copper pipe 51) remains located adjacent to open distal end 23 and away from open, threaded proximal end 21 (where galvanized pipe 50 is located).

The present disclosure further includes a method of utilizing a slip brass nipple 10 for preventing galvanic corrosion caused by a dielectric reaction between copper and galvanized pipes 51, 50. Such a method includes the initial step of: providing a tubular brass body 20 including an open, threaded proximal end 21, a gripping portion 22 integrally formed with an outer surface 30 of the body 20 and located adjacent to the proximal end 21, and an open distal end 23 spaced from the gripping portion 22. The open distal end 23 includes an internal stop 24 formed at in interior surface 31 thereof. The body 20 has first and second diameters 32, 33 wherein the first diameter 32 begins from the open distal end 23 and terminates at the internal stop 24. The second diameter 33 begins from the open, threaded proximal end 21 and terminates at the internal stop 24.

The method further includes the chronological steps of: providing and threadably engaging a galvanized pipe 50 with the open, threaded proximal end 21 of the body 20; providing and inserting a copper pipe 51 into the open distal end 23 of the body 20 until a leading end of the copper pipe reaches the internal stop 24; and welding the copper pipe 51 to the open distal end 23 of the body 20 such that the galvanized pipe 50 and the copper pipe 51 remain spaced apart and do not create a dielectric reaction (i.e., galvanic corrosion).

In a non-limiting exemplary embodiment, nipple 10 preferably includes a tubular brass body 20 that may be approximately 6 inches long. The nipple 10 may further include a threaded proximal end 21, a non-slip gripping portion 22 and an open distal end 23. The open distal end 23 may include an internal stop 24 to allow a copper pipe 51 to slip in and terminate at a predetermined distance such that the gripping portion 22 may be used to tighten onto a female tube fitting (e.g., coupling 45). The nipple 10 advantageously enables galvanized and copper pipes 50, 51 to be connected together while significantly reducing the risk of galvanic corrosion caused by a dielectric reaction between the galvanized steel and copper pipes 50, 51. The slip brass nipple 10 may further be manufactured in ½, ¾, 1, 1¼, 1½ and 2 inch diameters and may be manufactured according to brass material regulations in the industry.

While non-limiting exemplary embodiment(s) has/have been described with respect to certain specific embodiment(s), it will be appreciated that many modifications and changes may be made by those of ordinary skill in the relevant art(s) without departing from the true spirit and scope of the present disclosure. It is intended, therefore, by the appended claims to cover all such modifications and changes that fall within the true spirit and scope of the present disclosure. In particular, with respect to the above description, it is to be realized that the optimum dimensional relationships for the parts of the non-limiting exemplary embodiment(s) may include variations in size, materials, shape, form, function and manner of operation.

The Abstract of the Disclosure is provided to comply with 37 C.F.R. §1.72(b) and is submitted with the understanding that it will not be used to interpret or limit the scope or meaning of the claims. In addition, in the above Detailed Description, various features may have been grouped together or described in a single embodiment for the purpose of streamlining the disclosure. This disclosure is not to be interpreted as reflecting an intention that the claimed embodiment(s) require more features than are expressly recited in each claim. Rather, as the following claims reflect, inventive subject matter may be directed to less than all of the features of any of the disclosed non-limiting exemplary embodiment(s). Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiment(s) which fall within the true spirit and scope of the present disclosure. Thus, to the maximum extent allowed by law, the scope of the present disclosure is to be determined by the broadest permissible interpretation of the following claims and their equivalents, and shall not be restricted or limited by the above detailed description.

What is claimed is:

1. A slip brass nipple for preventing galvanic corrosion caused by a dielectric reaction, said slip brass nipple comprising:
   a brass body including
     an open, threaded proximal end;
     a gripping portion integrally formed with an outer surface of said body; and
     an open distal end spaced from said gripping portion;
   wherein said open distal end includes an internal stop formed at in interior surface thereof;
   wherein said body has first and second diameters, said first diameter beginning from said open distal end and terminating at said internal stop, said second diameter beginning from said open, threaded proximal end and terminating at said internal stop;
   wherein said gripping portion has an outermost surface provided with a plurality of indentations for creating a non-slip region;
   wherein said second diameter extends along a major longitudinal length of said body;
   wherein said first diameter extends along a minor longitudinal length of said body;
   wherein said outer surface of said body has a uniform outer diameter continuously extending entirely along said minor longitudinal length of said body and a portion of said major longitudinal length of said body.

2. The slip brass nipple of claim 1, wherein said body is entirely hollow and is provided with non-uniform passageway formed therein, said passageway extending through an entire longitudinal length of said body.

3. The slip brass nipple of claim 1, wherein an outermost diameter of said open, threaded region is smaller than an outermost diameter of said gripping portion.

4. The slip brass nipple of claim 1, wherein said first and second diameters uniformly extend along minor and major longitudinal lengths of said body, respectively.

5. A slip brass nipple for preventing galvanic corrosion caused by a dielectric reaction, said slip brass nipple comprising:
  a tubular brass body including
    an open, threaded proximal end;
    a gripping portion integrally formed with an outer surface of said body and located adjacent to said proximal end; and
    an open distal end spaced from said gripping portion;
  wherein said open distal end includes an internal stop formed at in interior surface thereof;
  wherein said body has first and second diameters, said first diameter beginning from said open distal end and terminating at said internal stop, said second diameter beginning from said open, threaded proximal end and terminating at said internal stop;
  wherein said gripping portion has an outermost surface provided with a plurality of indentations for creating a non-slip region;
  wherein said second diameter extends along a major longitudinal length of said body;
  wherein said first diameter extends along a minor longitudinal length of said body;
  wherein said outer surface of said body has a uniform outer diameter continuously extending entirely along said minor longitudinal length of said body and a portion of said major longitudinal length of said body.

6. The slip brass nipple of claim 5, wherein said body is entirely hollow and is provided with non-uniform passageway formed therein, said passageway extending through an entire longitudinal length of said body.

7. The slip brass nipple of claim 5, wherein an outermost diameter of said open, threaded region is smaller than an outermost diameter of said gripping portion.

8. The slip brass nipple of claim 5, wherein said first and second diameters uniformly extend along minor and major longitudinal lengths of said body, respectively.

\* \* \* \* \*